US005107534A

United States Patent [19]

Freyre

[11] Patent Number: 5,107,534

[45] Date of Patent: Apr. 21, 1992

[54] FLAT PANEL DISPLAY SYSTEM AND METHOD

[75] Inventor: Frederick W. Freyre, Wantagh, N.Y.

[73] Assignee: Hazeltine Corporation, Greenlawn, N.Y.

[21] Appl. No.: 411,968

[22] Filed: Sep. 25, 1989

[51] Int. Cl.[5] ..................... G02B 6/26

[52] U.S. Cl. ..................... 385/22; 385/8; 385/16

[58] Field of Search ............... 350/96.15, 96.19, 96.24, 350/334

[56] References Cited

U.S. PATENT DOCUMENTS 3,729,252 4/1973 Nelson ..................... 350/96.24 X
4,054,364 10/1977 Webster ..................... 350/96.24 X
4,299,447 11/1981 Soltan et al. ..................... 350/334
4,441,819 4/1984 Pryor ..................... 350/96.24 X
4,484,795 11/1984 Byron ..................... 350/96.19
4,793,680 12/1988 Byron ..................... 350/96.15 X
4,871,228 10/1989 Roos ..................... 350/96.24
4,917,448 4/1990 Oppenheimer ..................... 350/96.20 X

*Primary Examiner*—Frank Gonzalez
*Assistant Examiner*—Phan T. Heartney
*Attorney, Agent, or Firm*—E. A. Onders

[57] ABSTRACT

A flat panel display system is provided in which the pixels thereof are illuminated by optical fibers. Economy and compactness are achieved by using micromechanical light modulators to demultiplex light from a limited number of LED's to a large number of pixels. By using micromechanical light modulators incorporated in an integrated circuit, the flat panel display system is relatively economical, has low power consumption, and produces a display of very high resolution. The display also may be provided in full color.

13 Claims, 2 Drawing Sheets

FLAT PANEL DISPLAY SYSTEM AND METHOD

BACKGROUND OF THE INVENTION

This invention relates to flat panel displays generally and, more particularly, to a novel flat panel display system, and method, that employs demultiplexing to direct selected light inputs through optical fibers to appropriate pixel locations on the flat panel display.

Conventional flat panel displays may be of the liquid crystal type which have, as particular disadvantages, a rather narrow viewing angle and a limited operating temperature range. Others may be of the gas plasma or the electroluminescent types, both of which suffer the disadvantage of requiring high electrical potential and power consumption for operation, thus presenting a safety hazard as well as necessarily requiring components capable of handling the voltage levels involved. A further disadvantage of all of the above types of prior art flat panel displays is that each requires the use of relatively expensive components.

It is, therefore, an object of the present invention to provide an improved flat panel display system which offers high resolution, yet is of relatively inexpensive to construct.

It is another object of the invention to provide such a display which has low power consumption and employs relatively low electrical potentials.

It is a further object of the invention to provide such a display which makes multiple use of individual illumination sources for the display.

SUMMARY OF THE INVENTION

The present invention substantially overcomes the limitations of conventional devices and achieves the above objects, among others, by providing an improved flat panel display in which the pixels thereof are illuminated by optical fibers. Economy and compactness are achieved by using micromechanical light modulators to demultiplex light from a limited number of LED's to a large number of pixels. With the use of micromechanical light modulators incorporated on an integrated circuit, the flat panel display system is relatively economical, has low power consumption, and produces a display of very high resolution. The display may be provided in full color.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
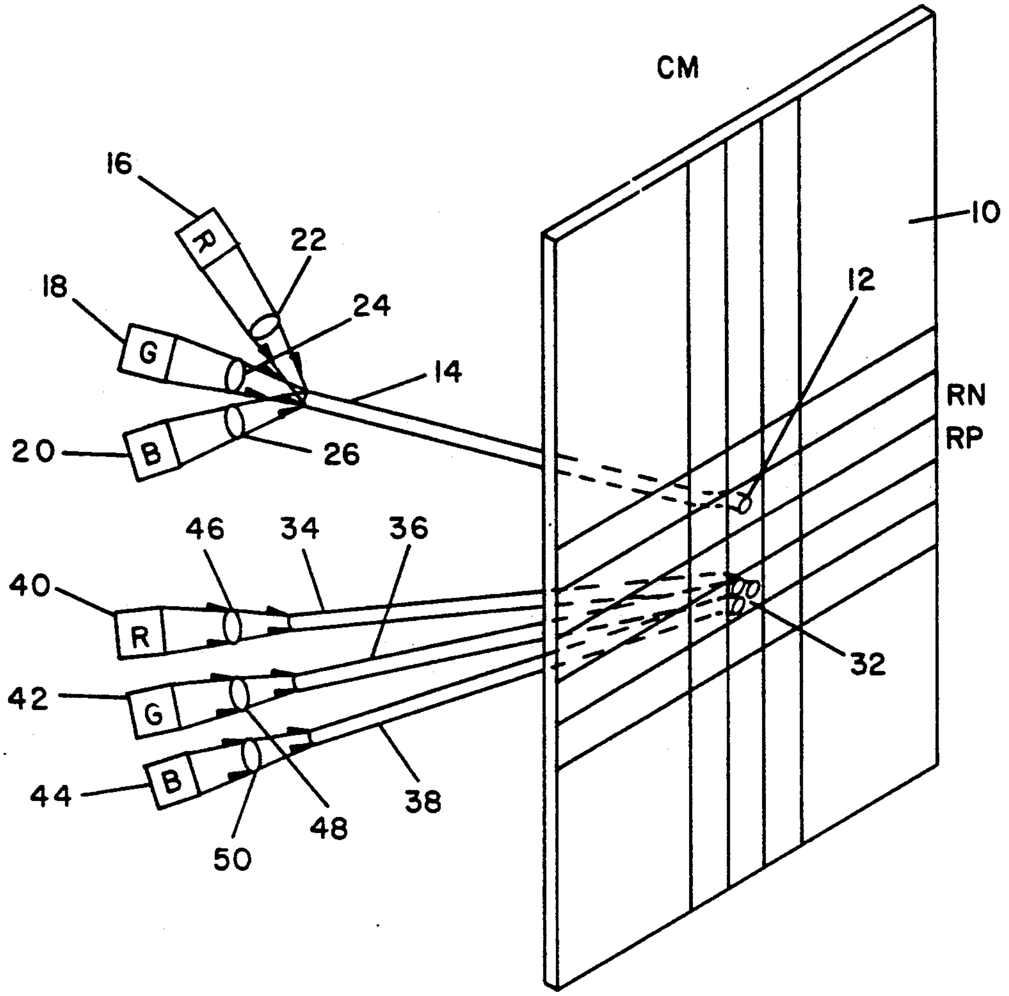
FIG. 1 is a schematic perspective representation of a portion of a flat panel display system showing alternative means of pixel illumination, according to the present invention.

FIG. 1 is a perspective, schematic, fragmentary representation of a flat panel display system according to the present invention, which includes a flat panel 10 formed from a light diffusing material such as ground glass. If desired, flat panel 10 may be clear with a layer of phosphorluminescent material thereon to provide an appropriate time constant in the decay of the illumination. It will be understood that the area of display 10, as is true with conventional displays, is divided into a large number of picture element areas, or pixels, the location of each being defined by its assignment to a specific imaginary column and row on the display, such as pixel 12 the location of which is defined by its being located in imaginary Column M and Row N. The orthogonal lines shown on panel 10 in FIG. 1 will be understood as being imaginary and are shown solely for convenience in describing pixel locations.

Illumination at pixel 12 is provided by the termination there at of an optical fiber 14. Optical fiber 14 is optically coupled at its other end to red light source 16, green light source 18, and blue light source 20, the wavelengths of those light sources corresponding, respectively, to the three primary colors. Lenses 22, 24, and 26 may be disposed between light sources 16, 18, and 20, respectively, if necessary, to assist in coupling light from the sources to the end of optical fiber 14. The color (or black or white) appearing at pixel 12 will depend on which or all of light sources 16, 18, and 20 are on or off and the relative intensity of the individual light sources. This may be controlled via the control means 52 shown in FIGS. 2 and 3. It will be understood that similar optical fibers and similar light sources would be provided for each of the other pixels on display 10.

An alternative method of providing illumination at a pixel is shown in FIG. 1 where illumination of a pixel 32, located in Column M and Row P, is provided by three separate optical fibers 34, 36, and 38, which are coupled to primary color light sources 40, 42, and 44, respectively, through, if necessary, lenses 46, 48, and 50, respectively. In this case, the ends of optical fibers 34, 36, and 38 at pixel 32 are so closely spaced that the illumination by the optical fibers is combined in the eye of the viewer when the viewer is positioned at normal distances from display 10 so that the same effect is achieved as at pixel 12 where the single optical fiber 14 terminates at pixel 12. Again, if this method is provided, each pixel on display 10 will be provided with three optical fibers. This means, of course, that three times as many optical fibers are required; however, this method avoids having to couple the light to the optical fibers at an angle.

Although the above systems have been described in terms of providing a full color display, the display may instead be provided simply in black-and-white or monochrome.

In the above system, light sources 16, 18, 20, 40, 42, and 44 may be individual light sources, such as LED's, lamps, or lasers, for example; however, it will be appreciated that such would require a very large number of light sources.

Figure 2:
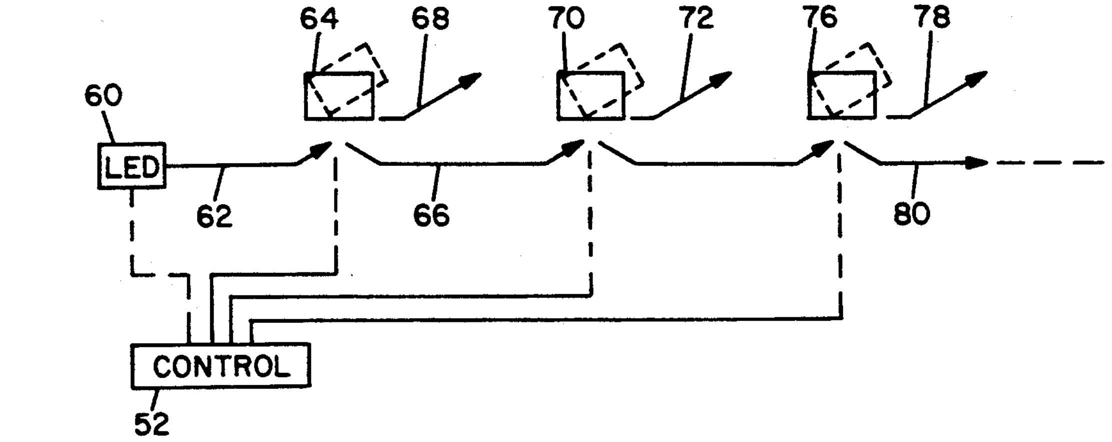
FIG. 2 is a schematic representation of a "daisy chain" light demultiplexer useful in the system of FIG. 1.

FIG. 2 illustrates one means by which a single light source may be used to provide illumination to a plurality of pixels on a display through the use of micromechanical light switches, or modulators. The operation and construction of such devices are described in the article "Micromechanical light modulators on silicon," by Robert E. Brooks, printed in *OPTICAL ENGINEERING*, January/February 1985, Vol. 24, No. 1, beginning at page 101, which article, and the references cited therein, are made a part hereof by reference. An improved form of electromechanical light modulator useful in implementing the present invention is disclosed in my co-pending U.S. patent application Ser. No. 07/411,969, filed Sept. 25, 1989 and assigned to the same assignee. Basically, the micromechanical light modulator comprises a reflective metal-coated silicon dioxide paddle which is cantilevered over a well into which it can be deflected by an electrical charge on a substrate under the paddle. The angle of reflection is determined by the magnitude of the charge and a number of deflection angles can be resolved with a single paddle. An important feature of the modulators is that they can be formed as part of an integrated circuit and disposed in high density. For example, in a 2×18 array described, the paddles are 60 microns square, 0.6 microns thick over 5-micron deep wells, and spaced on 87.5-micron centers. Each of the paddles is electronically selectively addressable. It will thus be understood that a very large number of such modulators may be provided compactly on an integrated circuit and the voltage and power requirements are inherently low. Because of the smallness of all of the compents, the system can be readily configured as a flat panel display.

Referring again to FIG. 2, a light source 60, which may be assumed to be an LED producing one of the primary colors, is disposed so as to provide illumination to the end of an optical fiber 62. The other end of optical fiber 62 is disposed so that the beam of light therefrom is incident upon micromechanical light modulator 64, which, when the modulator is in the position shown in solid lines, reflects the light beam so that it is coupled to one end of optical fiber 66. But, when the modulator is in the position shown in dashed lines, the light beam is coupled to the end of optical fiber 68. If coupled to optical fiber 68, the light beam is transmitted to a flat panel display (not shown). If, however, the light beam is coupled to optical fiber 66, it is transmitted to another micromechanical light modulator 70 where, in similar fashion, the light beam may be coupled either to optical fiber 72 for transmission to the flat panel display or to an optical fiber for transmission to yet another micromechanical light modulator 76. If the latter, then micromechanical light modulator 76 will couple the light beam to either one of optical fibers 78 or 80, and so forth, for all or part of a row or column of pixels or even multiple rows and/or columns. The operation of the light modulators 64, 70 and 76, and the light source 60, is controlled by control means 52 so as to display information desired on the display screen. For the full-color displays described above, there would be provided a red-green-blue trio of such "daisy chains" coupled to pixel 12 or pixel 32 (FIG. 1). Since the micromechanical modulators can operate at frequencies up to about 1 MHz., one light source can satisfactorily provide illumination to a large number of pixels, with the viewer's eye integrating the light from the display so that the multiplexed operation is not apparent.

Figure 3:
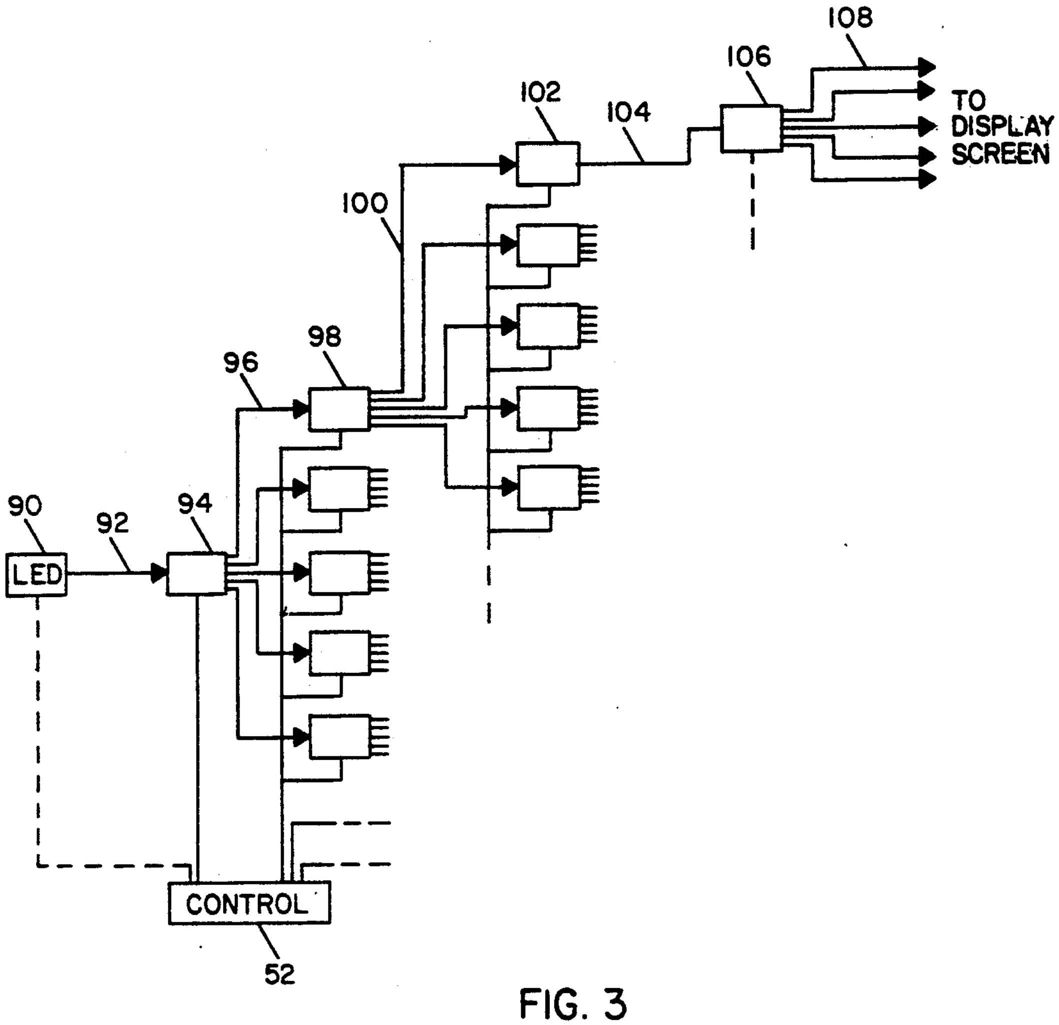
FIG. 3 is a schematic representation of a "tree" demultiplexer useful in the system of FIG. 1.

One disadvantage of the daisy chain approach is that the intensity of the light beam decreases by a certain increment each time it is reflected. Therefore, if the light beam were switched to the display early in the chain, it would have a greater intensity than if it were switched to the display later in the chain. This disadvantage can be eliminated if the "tree" configuration demultiplexer shown in FIG. 3 is employed. Here, following only one branching of the "tree," light source 90 provides illumination to one end of optical fiber 92 which transmits the light beam to micromechanical light modulator 94, which in turn couples the light beam to a selective one of five optical fibers, here, for example, optical fiber 96. Optical fiber 96 transmits the light beam to micromechanical light modulator 98 which, in turn, couples the light beam to optical fiber 100, for example, and so forth, to micromechanical light modulator 102, optical fiber 104, micromechanical light modulator 106, and to optical fiber 108 which transmits the light beam to the display.

Thus, with the tree demultiplexer configuration of FIG. 3, a single light source, LED 90, provides illumination to any of 625 pixels under the control of control means 52. Of course, a tree demultiplexer may be constructed to serve a larger or smaller number of pixels, FIG. 3 being for illustrative purposes only. In any case, use of the tree demultiplexer assures that all light beams are switched an equal number of times before reaching the display.

Figure 4:
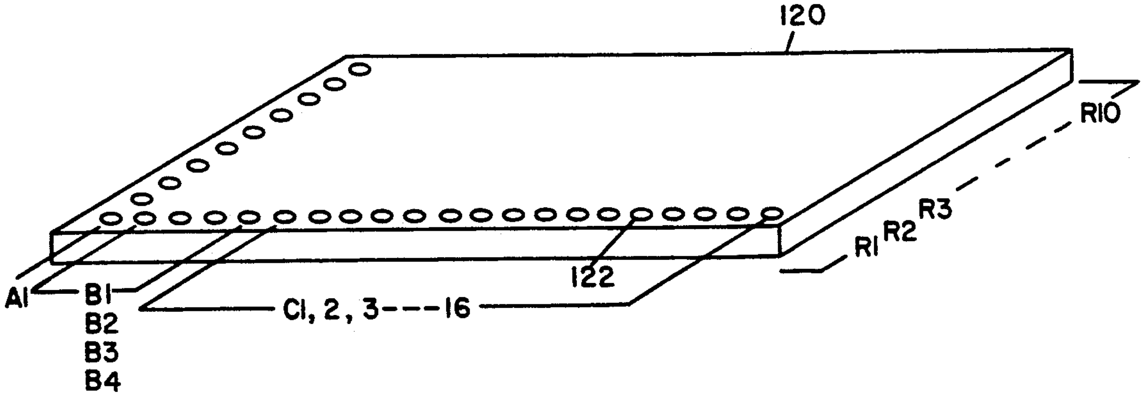
FIG. 4 illustrates an array of micromechanical light modulators by which 640 pixels of a display may be illuminated by 10 light sources, according to the present invention.

FIG. 4 shows how the micromechanical light modulators of the tree configuration demultiplexer of FIG. 3 may be constructed. Here, an array 120 of micromechanical light modulators, which may be assumed to be formed on the surface of an integrated circuit as an integral part thereof, such as micromechanical light modulator 122, has the modulators rectilinearly arranged in rows R1–R10 and columns A1, B1–B4, and C1–C16. Whereas in the tree demultiplexer of FIG. 3, each micromechanical light modulator optically coupled the light output of one optical fiber to a selected one of five other optical fibers, on array 120 each micromechanical light modulator optically couples the light output of one optical fiber to a selected one of four other optical fibers (none of the optical fibers are shown in FIG. 4). It will be understood, then, for example, that the micromechanical light modulator at column A1 and row R1 will optically couple a light source to any selected one of four optical fibers which lead to the micromechanical light modulators at columns B1–B4 and row R1. Each one of four latter micromechanical light modulators will, in turn, couple the light to any selected one of four optical fibers which lead to four of the micromechanical light modulators at columns C1–C16 and row R1, which, in turn, will couple the light to corresponding pixels on the display panel (not shown). Thus, with array 120, only ten light sources may be used to illuminate a total of 640 pixels $(((10\times4)\times4)\times4)$.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An electro-optical display system, comprising:

a display screen having a plurality of areas thereof designated as pixels;

at least one light source;

a plurality of first optical fibers, each of which has a first end for receiving light coupled to it and a second end associated with a specific one of said pixels for illuminating said specific pixel when light is coupled to the first end of said first optical fiber;

a second optical fiber having a first end, for receiving light from said light source, and a second end;

electro-optical demultiplexing means for selectively coupling light from the second end of said second optical fiber to the first end of either of at least two of said first optical fibers; and means for controlling said demultiplexing means so as to cause selected ones of said pixels to be illuminated, whereby information may be displayed.

2. The system of claim 1, wherein there is included a plurality of light sources and wherein said second optical fiber receives light from a selected number of said light sources.

3. The system of claim 2, wherein said control means also controls the multiple light sources which feed said second optical fiber, thereby also controlling the nature of the light fed to said second optical fiber.

4. An electro-optical display system, comprising:

a display screen having a plurality of areas thereof designated as pixels;

at least one light source;

a plurality of first optical fibers, each of which has a first end to which light may be coupled and a second end associated with a specific one of said pixels for illuminating said specific pixel;

a second optical fiber having a first end, for receiving light from said light source, and a second end;

a plurality of third optical fibers, each having a first end, for receiving light, and a second end;

a plurality of electro-optical light switching means, each of which has an input for receiving light and a plurality of outputs to which said light can be coupled, arranged in a daisy chain configuration and including:

an initial electro-optical light switching means for selectively coupling light from the second end of said second optical fiber to either the first end of a selected one of said first optical fibers or the first end of a third optical fiber;

a plurality of intermediate electro-optical light switching means for selectively coupling light from the second end of a corresponding one of said third optical fibers to the first end of a selected one of said first optical fibers or to the first end of another of said third optical fibers;

a final electro-optical light switching means for selectively coupling light from the second end of one of said third optical fibers to the first end of either of at least two of said first optical fibers; and means for controlling said electro-optical light switching means so as to cause selected ones of said pixels to be illuminated, whereby information may be displayed.

5. The system of claim 4 wherein each of said electro-optical light switching means includes a micromechanical light modulator.

6. The system of claim 4, wherein there is included a plurality of light sources and wherein said second optical fiber receives light from a selected number of said light sources.

7. The system of claim 6, wherein said control means also controls the multiple light sources which feed said second optical fiber, thereby also controlling the nature of the light fed to said second optical fiber.

8. An electro-optical display system, comprising:

a display screen having a plurality of areas thereof designated as pixels;

at least one light source;

a plurality of first optical fibers, each of which has a first end to which light may be coupled and a second end associated with a specific one of said pixels for illuminating said specific pixel;

a second optical fiber having a first end, for receiving light from said light source, and a second end;

a plurality of electro-optical light switching means, each of which has an input for receiving light and a plurality of outputs to which said light can be coupled, arranged in a tree configuration and including:

an initial electro-optical light switching means for selectively coupling light from the second end of said second optical fiber to the inputs of selected ones of a first plurality of intermediate electro-optical light switching means;

a plurality of intermediate electro-optical light switching means for selectively coupling light from the outputs of said initial light switching means to the inputs of a plurality of final electro-optical light switching means;

a plurality of final electro-optical light switching means for selectively coupling light from the outputs of selected ones of said intermediate light switching means to the inputs of said first optical fibers; and means for controlling said light switching means so as to cause selected ones of said pixels to be illuminated, whereby information may be displayed.

9. The system of claim 8, wherein each of said electro-optical light switching means includes a micromechanical light modulator.

10. The system of claim 8, wherein there is included a plurality of light sources and wherein said second optical fiber receives light from a selected number of said light sources.

11. The system of claim 9, wherein said control means also controls the multiple light sources which feed said second optical fiber, thereby also controlling the nature of the light fed to said second optical fiber.

12. A method of displaying information, comprising:

providing a display screen having a plurality of areas thereof designated as pixels;

providing at least one light source;

providing a plurality of first optical fibers, each of which has a first end for receiving light coupled to it and a second end associated with a specific one of said pixels for illuminating said specific pixel;

selectively coupling light from said source to the first end of selected ones of said first optical fibers using a daisy chain light distribution approach, thereby to display information.

13. A method of displaying information, comprising:

providing a display screen having a plurality of areas thereof designated as pixels;

providing at least one light source;

providing a plurality of first optical fibers, each of which has a first end for receiving light coupled to it and a second end associated with a specific one of said pixels for illuminating said specific pixel when light is coupled to the first end of said optical fiber; and selectively coupling light from said source to the first end of selected ones of said first optical fibers using a tree configuration light distribution approach, thereby to display information.

* * * * *